United States Patent
Dong

(10) Patent No.: US 10,140,689 B2
(45) Date of Patent: Nov. 27, 2018

(54) EFFICIENT PATH-BASED METHOD FOR VIDEO DENOISING

(71) Applicant: SONY CORPORATION, Tokyo (JP)

(72) Inventor: Xiaogang Dong, Boyds, MD (US)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 15/410,978

(22) Filed: Jan. 20, 2017

(65) Prior Publication Data

US 2018/0211365 A1 Jul. 26, 2018

(51) Int. Cl.
| | | |
|---|---|---|
| *G06T 5/00* | (2006.01) | |
| *G06T 5/50* | (2006.01) | |
| *G06T 7/20* | (2017.01) | |
| *H04N 5/217* | (2011.01) | |
| *G06T 7/246* | (2017.01) | |

(52) U.S. Cl.
CPC ............. *G06T 5/002* (2013.01); *G06T 5/50* (2013.01); *G06T 7/20* (2013.01); *G06T 7/248* (2017.01); *H04N 5/217* (2013.01); *G06T 2207/10016* (2013.01); *G06T 2207/20012* (2013.01); *G06T 2207/20021* (2013.01); *G06T 2207/20182* (2013.01)

(58) Field of Classification Search
CPC .. G06T 5/002; G06T 5/50; G06T 7/20; G06T 2200/12; G06T 2207/10016; G06T 2207/10024; G06T 2207/20012; G06T 2207/20028; G06T 7/248; G06T 2207/20021; G06T 2207/20182; H04N 5/217

See application file for complete search history.

(56) References Cited

U.S. PATENT DOCUMENTS

| | | | |
|---|---|---|---|
| 6,366,317 B1 * | 4/2002 | Mattison | H01L 27/14643 257/E27.133 |
| 8,144,253 B2 | 3/2012 | Su et al. | |
| 8,233,730 B1 * | 7/2012 | Namboodiri | H04N 7/014 382/232 |
| 9,131,073 B1 * | 9/2015 | Bankoski | H04N 7/00 |
| 9,135,683 B2 | 9/2015 | Pavani | |
| 9,171,355 B2 | 10/2015 | Zhuo et al. | |
| 9,449,371 B1 * | 9/2016 | Sheng | G06T 5/002 |
| 9,466,094 B1 * | 10/2016 | Dong | G06T 5/002 |
| 10,049,436 B1 * | 8/2018 | Chen | G06T 5/002 |
| 2010/0013963 A1 * | 1/2010 | Jannard | H04N 5/3675 348/242 |
| 2010/0309379 A1 * | 12/2010 | Schoenblum | H04N 5/21 348/608 |

(Continued)

OTHER PUBLICATIONS

Buades et al., "Patch-Based Video Denoising With Optical Flow Estimation", IEEE Transactions on Image Processing, vol. 25, No. 6, Jun. 2016; pp. 2573-2586.*

(Continued)

*Primary Examiner* — Mekonen Bekele

(74) *Attorney, Agent, or Firm* — Haverstock & Owens LLP

(57) ABSTRACT

An efficient patch-based method for video denoising is described herein. A noisy patch is selected from a current frame and a motion-compensated patch in the previous denoised frame is found. The two patches go through a patch-denoising process to generate a denoised patch. A rotational buffer and aggregation technique is used to generate the denoised current video frame.

15 Claims, 4 Drawing Sheets

(56) References Cited

U.S. PATENT DOCUMENTS

| | | | | |
|---|---|---|---|---|
| 2010/0309989 A1* | 12/2010 | Schoenblum | ............ | G06T 5/50 375/240.29 |
| 2013/0266057 A1* | 10/2013 | Kokaram | ............ | H04N 19/117 375/240.02 |
| 2013/0314557 A1* | 11/2013 | Furukawa | ............. | H04N 5/225 348/208.1 |
| 2014/0078347 A1* | 3/2014 | DeBattista | ......... | H04N 5/23229 348/241 |
| 2016/0094843 A1* | 3/2016 | Kopp | ...................... | G06T 5/002 375/240.02 |
| 2016/0284066 A1* | 9/2016 | Dong | ...................... | G06T 5/002 |
| 2017/0374363 A1* | 12/2017 | Deng | ...................... | G06T 5/002 |
| 2018/0061015 A1* | 3/2018 | Guo | ......................... | H04N 5/21 |

OTHER PUBLICATIONS

Amur et al., "Memory-Efficient GroupBy-Aggregate using Compressed Buffer Trees", ACM, Oct. 1-3, 2013,pp. 16.*

Buades Antoni et al, "Patch-Based Video Denoising With Optical Flow Estimation", IEEE Transaction on Image Processing, IEEE Service Center, Piscataway, NJ, US, vol. 25, No. 6, Jun. 1, 2016 (Jun. 1, 2016), pp. 2573-2586, XP011607214, ISSN: 1057-7149, D01: 10.1109/TIP.2016.2551639.

Extended European Search Report from European Application No. 18150464.8-1210, dated Mar. 14, 2018.

* cited by examiner

EFFICIENT PATH-BASED METHOD FOR VIDEO DENOISING

FIELD OF THE INVENTION

The present invention relates to video processing. More specifically, the present invention relates to video denoising.

BACKGROUND OF THE INVENTION

Video recording is a standard feature for cameras, smart phones, tablets and many other devices. Compact cameras and mobile devices such as phones and tablets are usually equipped with smaller size image sensors and less than ideal optics. Video denoising is especially important for these devices. High-end cameras and camcorders are generally equipped with larger size image sensors and better optics. Captured videos using these devices have decent quality under normal lighting conditions. However, videos recorded under low light conditions still demand significant improvement even for high-end cameras and camcorders. In addition, many recording devices have increased their resolutions in recent years (e.g., from SD to HD, from HD to 4K, and maybe 4K to 8K in the future). Increased video resolution lowers the signal-to-noise ratio at every pixel location on the image sensor. Video denoising becomes even more challenging with increased video resolution.

Many methods were proposed to address video denoising including "A method to improve video quality under low light conditions" as described in U.S. patent application Ser. No. 14/669,433, filed on Mar. 26, 2015. Utilizing an entire video frame for video denoising requires large computation power and storage space since both single-frame denoising and difference-frame denoising results are calculated and stored. Therefore a more efficient video denoising method in both computation power and memory usage is being demanded.

SUMMARY OF THE INVENTION

An efficient patch-based method for video denoising is described herein. A noisy patch is selected from a current frame and a motion-compensated patch in the previous denoised frame is found. The two patches go through a patch-denoising process to generate a denoised patch. A rotational buffer and aggregation technique is used to generate the denoised current video frame.

In one aspect, a method programmed in a non-transitory memory of a device comprises estimating motion to generate motion estimation information based on a current noisy frame and a previously denoised frame, generating a motion estimation-compensated previous patch with the motion estimation information, processing a current noisy patch from the current noisy frame and the motion estimation-compensated previous patch to generate a denoised patch and aggregating the denoised patch and additional denoised patches to generate a denoised frame. The method further comprises selecting the current noisy frame from a video, and selecting the current noisy patch from the current noisy frame. Selecting the current noisy frame and selecting the current noisy patch are performed sequentially. Selecting the current noisy frame and selecting the current noisy patch are based on comparing noise of each the current noisy frame and the current noisy patch with one or more thresholds. Aggregating includes utilizing a rotation-buffer aggregation. Processing the current noisy patch from the current noisy frame and the motion estimation-compensated previous patch to generate the denoised patch includes: generating a difference patch from the current noisy patch and a previous denoised patch, when a sum of absolute values of the difference patch is greater than a threshold, the current noisy patch is denoised to generate the denoised patch and when the sum of absolute values of the difference patch is not greater than the threshold, the difference patch is denoised, the denoised difference patch and the previous denoised patch are used to determine a temporal denoised patch, and blending the temporal denoised patch and the current noisy patch to generate the denoised patch.

In another aspect, an apparatus comprises a non-transitory memory for storing an application, the application for: estimating motion to generate motion estimation information based on a current noisy frame and a previously denoised frame, generating a motion estimation-compensated previous patch with the motion estimation information, processing a current noisy patch from the current noisy frame and the motion estimation-compensated previous patch to generate a denoised patch and aggregating the denoised patch and additional denoised patches to generate a denoised frame and a processing component coupled to the memory, the processing component configured for processing the application. The apparatus further comprises selecting the current noisy frame from a video, and selecting the current noisy patch from the current noisy frame. Selecting the current noisy frame and selecting the current noisy patch are performed sequentially. Selecting the current noisy frame and selecting the current noisy patch are based on comparing noise of each the current noisy frame and the current noisy patch with one or more thresholds. Aggregating includes utilizing a rotation-buffer aggregation. Processing the current noisy patch from the current noisy frame and the motion estimation-compensated previous patch to generate the denoised patch includes: generating a difference patch from the current noisy patch and a previous denoised patch, when a sum of absolute values of the difference patch is greater than a threshold, the current noisy patch is denoised to generate the denoised patch and when the sum of absolute values of the difference patch is not greater than the threshold, the difference patch is denoised, the denoised difference patch and the previous denoised patch are used to determine a temporal denoised patch, and blending the temporal denoised patch and the current noisy patch to generate the denoised patch.

In another aspect, a system comprises a camera for acquiring a video and a computing device configured for: estimating motion to generate motion estimation information based on a current noisy frame and a previously denoised frame of the video, generating a motion estimation-compensated previous patch with the motion estimation information, processing a current noisy patch from the current noisy frame and the motion estimation-compensated previous patch to generate a denoised patch and aggregating the denoised patch and additional denoised patches to generate a denoised frame and a processing component coupled to the memory, the processing component configured for processing the application. The system further comprises selecting the current noisy frame from the video, and selecting the current noisy patch from the current noisy frame. Selecting the current noisy frame and selecting the current noisy patch are performed sequentially. Selecting the current noisy frame and selecting the current noisy patch are based on comparing noise of each the current noisy frame and the current noisy patch with one or more thresholds. Aggregating includes utilizing a rotation-buffer aggregation. Processing the current noisy patch from the current noisy frame and the motion estimation-compensated previous patch to generate the denoised patch includes: generating a difference patch from the current noisy patch and a previous denoised patch, when a sum of absolute values of the difference patch is greater than a threshold, the current noisy patch is denoised to generate the denoised patch and when the sum of absolute values of the difference patch is not greater than the threshold, the difference patch is denoised, the denoised difference patch and the previous denoised patch are used to determine a temporal denoised patch, and blending the temporal denoised patch and the current noisy patch to generate the denoised patch.

DETAILED DESCRIPTION OF THE PREFERRED EMBODIMENT

An efficient patch-based method for video denoising is described herein. A noisy patch is selected from a current frame and a motion-compensated patch in the previous denoised frame is found. The two patches go through a patch-denoising process to generate a denoised patch. The rotational buffer and aggregation technique is used to generate the denoised current video frame. The efficient patch-based method cuts computation costs and memory usage significantly.

Figure 1:
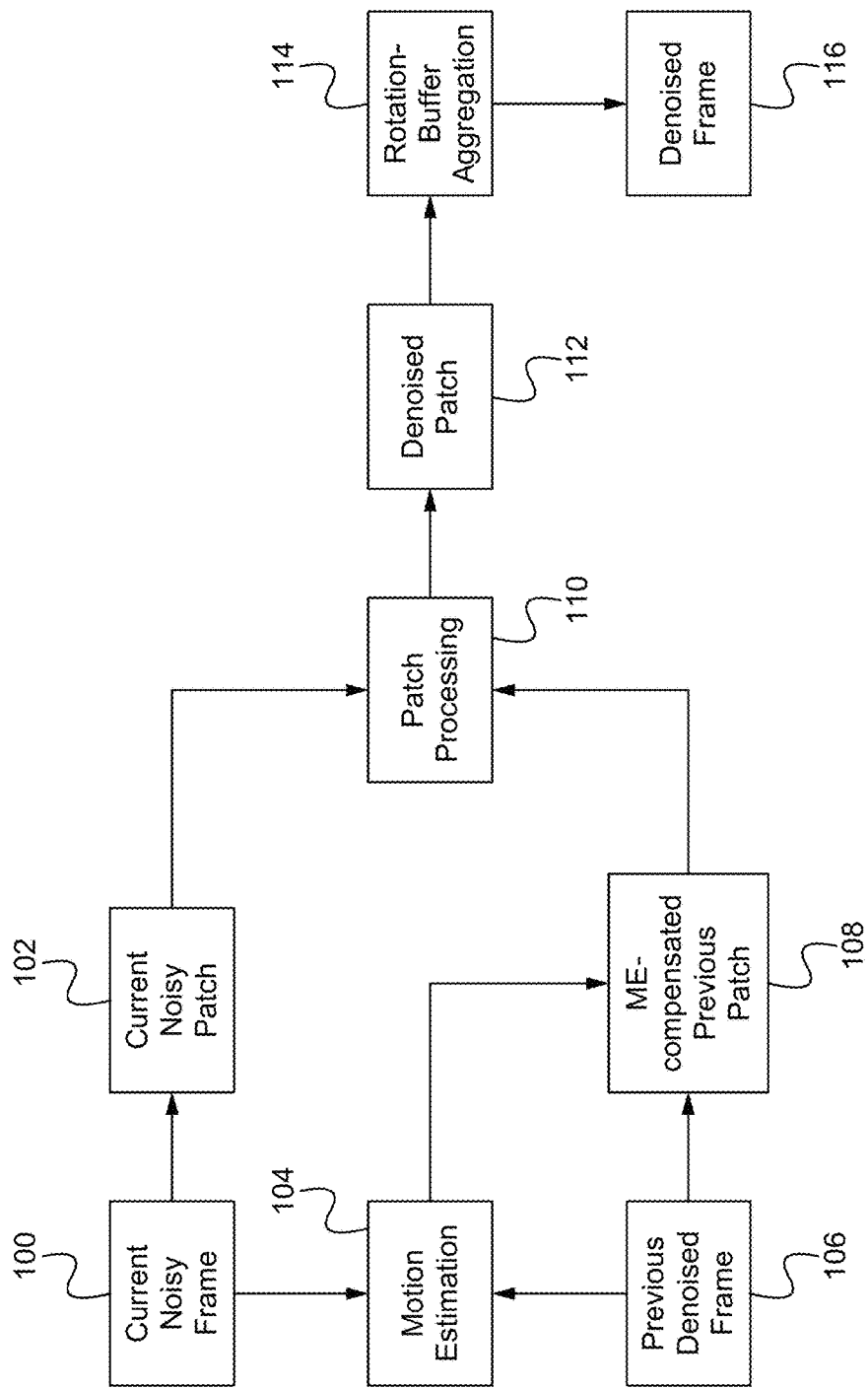
FIG. 1 illustrates a flow chart of a patch-based method for video denoising according to some embodiments.

FIG. 1 illustrates a flow chart of a patch-based method for video denoising according to some embodiments. In the step 100, a current noisy frame is selected. For example, from a video, frames are usually selected sequentially. Another order of frame selection may also be possible. In some embodiments, only frames determined to be noisy are selected (e.g., frames that are determined to have a noise level above a threshold). In the step 102, a current noisy patch is selected from the current noisy frame. For example, from a noisy frame, patches are selected sequentially, or in another order. In some embodiments, only patches determined to be noisy are selected (e.g., patches that are determined to have a noise level above a threshold). In the step 104, motion is estimated to generate motion estimation information based on the current noisy frame 100 and the previously denoised frame 106. Any motion estimation implementation is usable such as optical flow, block-matching, and/or phase correlation. The motion estimation information and the previously denoised frame are utilized to generate a motion estimation-compensated previous patch, in the step 108. In the step 110, the current noisy patch and the motion estimation-compensated previous patch are processed to generate a denoised patch 112. The processing is able to be any image/video processing implementation such as determining a difference between the patches, combining the patches and/or any other processing. In some embodiments, processing includes the processing shown in FIG. 2. In the step 114, the denoised patches are aggregated using a rotation-buffer aggregation to generate a denoised frame 116. The aggregation is able to include combining the patches to generate a frame such as sequentially stitching the patches together and/or any other aggregation. In some embodiments, additional or fewer steps are implemented. In some embodiments, the order of the steps is modified.

Figure 2:
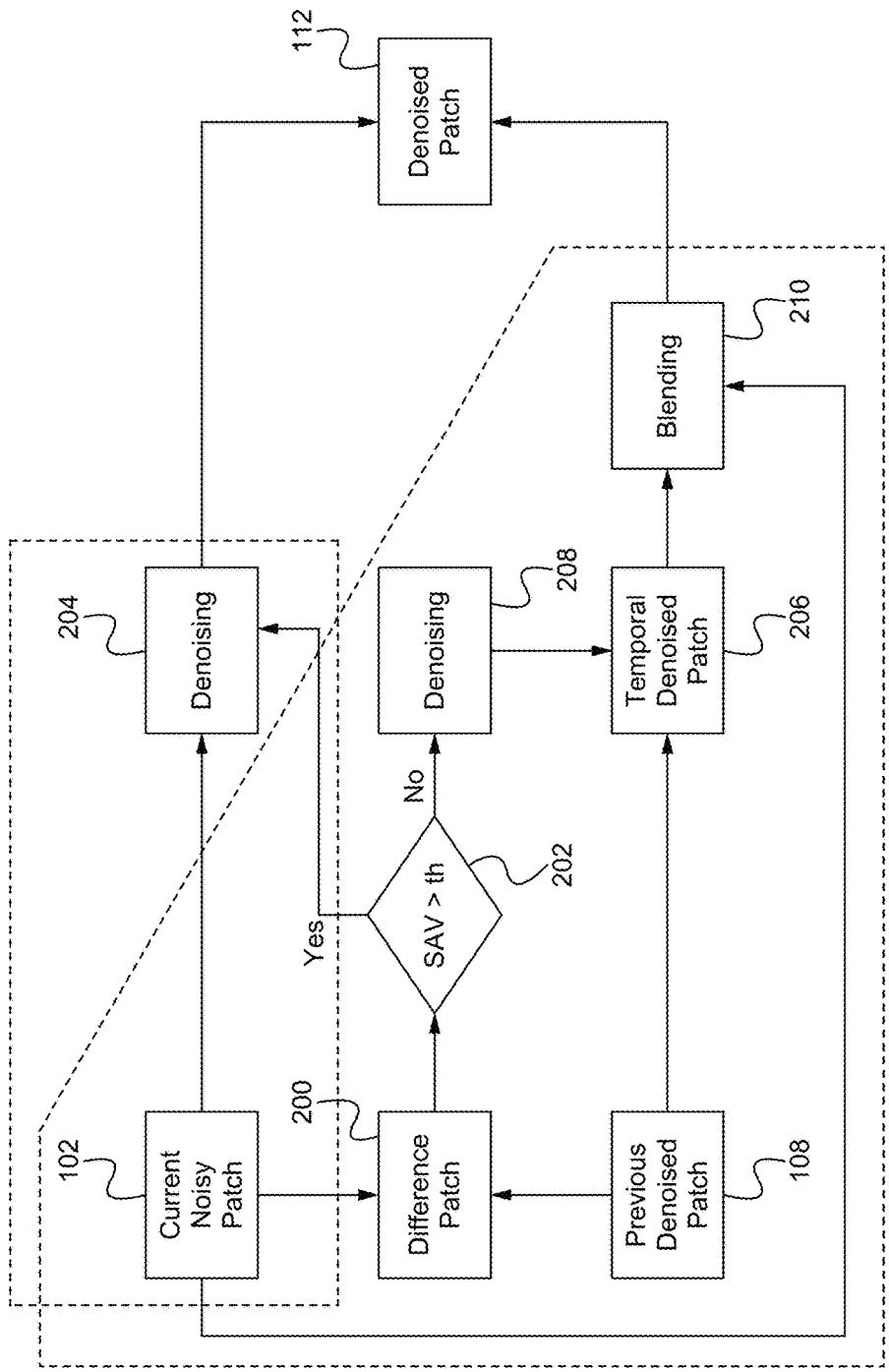
FIG. 2 illustrates a flow chart of a patch-based processing method according to some embodiments.

FIG. 2 illustrates a flow chart of a patch-based processing method according to some embodiments. A current noisy patch 102 and a previous denoised patch 108 are used to generate a difference patch 200. For example, using image/video processing operations, the difference between the current noisy patch 102 and the previous denoised patch 108 is determined. In the step 202, it is determined if the Sum of Absolute Values (SAV) for the difference patch 200 is greater than a threshold. If the SAV of the difference patch 200 is greater than the threshold, the current noisy patch 102 is considered "dissimilar" from the previous denoised patch 108. Such dissimilarity between the two patches usually results from the unsatisfying performance of the motion estimation step 104. Due to dissimilarity, it is not reliable to use the information contained in the previous denoised patch 108 to help denoise the current noisy patch 102. Therefore, only the current noisy patch 102 itself is used, in the denoising step 204, to generate a denoised patch 112. Any appropriate denoising scheme is able to be implemented in the step 204. If the SAV of the difference patch 200 is not greater than the threshold, then the current noisy patch 102 is considered similar to the previous denoised patch 108. In this case, it is helpful to use the information from both patches to generate a denoised patch. Due to similarity of these two patches, the difference patch 200 between them is usually sparse, e.g., most of the pixels in the difference patch 200 are zeros or near-zeros. Then the difference patch is denoised, in the step 208. A method other than the SAV of the difference patch 200 may also be used to check the similarity between the current noisy patch 102 and the previous denoised patch 108. Depending on the result of the similarity check, either the denoising step 204 for the current noisy patch 102 or the denoising step 208 for the noisy difference patch 200 is executed. Since the two computational intensive denoising steps 204 and 208 are not executed at the same time, the computation cost is significantly reduced. The denoising schemes used in the steps 204 and 208 may be the same or different. When the same scheme is used in the steps 204 and 208, it provides a significant advantage in a hardware implementation of the described method. The steps 204 and 208 may share a single set of hardware that performs the desired denoising technique. The denoised difference patch and the previous denoised patch 108 are used to determine a temporal denoised patch 206. The temporal denoised patch 206 may be a simple summation of the denoised difference patch and the previous denoised patch 108. Other possible methods of combining such as weighted sum may also be used. If the temporal denoised patch 206 is used as the final output of denoised patch, some temporal artifacts such as ringing and ghosting may be observed. This is due to unavoidable errors in the similarity check between the current noisy patch 102 and the previous denoised patch 108. In order to suppress the temporal artifacts, the temporal denoised patch 206 and the current noisy patch 102 are blended together, in step 210, to generate the denoised patch 112. The blending may be implemented as a linear combination of the temporal denoised patch 206 and the current noisy patch 102. Other blending techniques may also be used here. A blending more biased towards the temporal denoised patch 206 may result smoother videos with some occasional temporal artifacts such as ringing and ghosting. On the other hand, a blending more biased towards the current noisy patch 102 may result in noisier videos with less temporal artifacts. An appropriate blending to set such a tradeoff shall be selected. In some embodiments, fewer or additional steps are implemented. In some embodiments, the order of the steps is modified.

Figure 3:
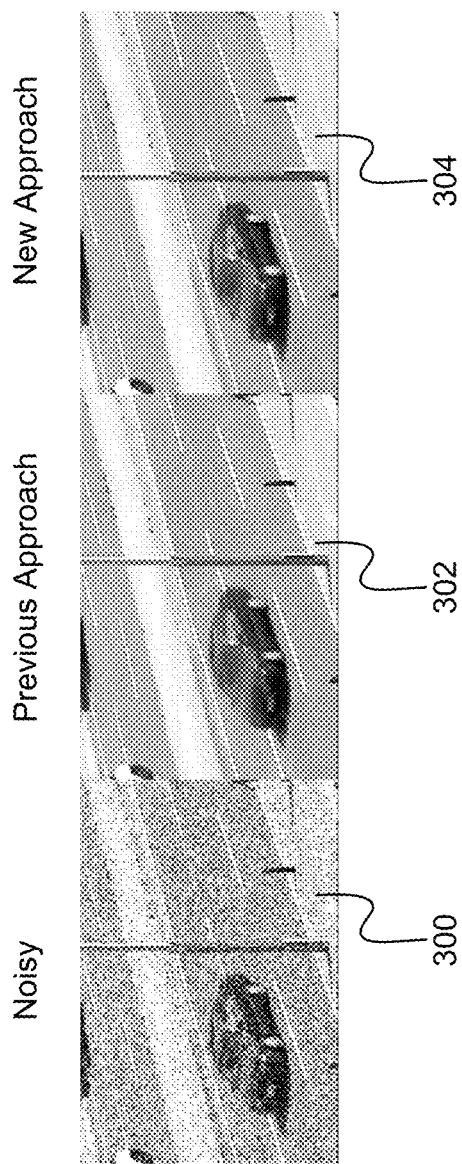
FIG. 3 illustrates images according to some embodiments.

FIG. 3 illustrates images according to some embodiments. A noisy image 300 is denoised using a prior art approach resulting in a prior art result 302. The noisy image 300 is also denoised using the patch-based method for video denoising as described herein resulting in the patch-based denoised result 304. As described herein, the patch-based method for video denoising is much more efficient in terms of computational cost and memory usage than the prior art.

Figure 4:
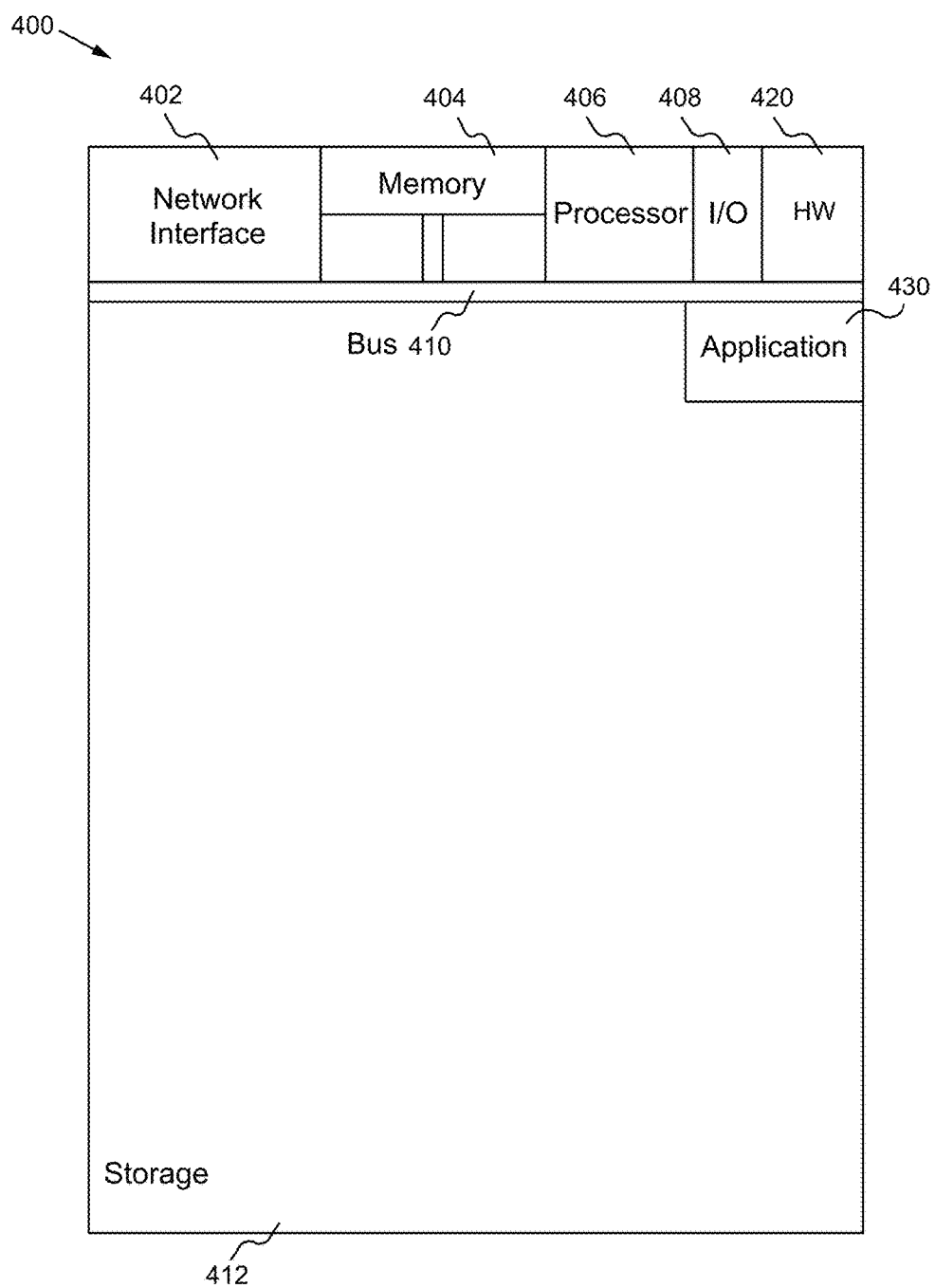
FIG. 4 illustrates a block diagram of an exemplary computing device configured to implement the patch-based method for video denoising according to some embodiments.

FIG. 4 illustrates a block diagram of an exemplary computing device configured to implement the patch-based method for video denoising according to some embodiments. The computing device 400 is able to be used to acquire, store, compute, process, communicate and/or display information such as images and videos. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, Blu-ray drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Patch-based method for video denoising application(s) 430 used to perform the patch-based method for video denoising are likely to be stored in the storage device 412 and memory 404 and processed as applications are typically processed. More or fewer components shown in FIG. 4 are able to be included in the computing device 400. In some embodiments, patch-based method for video denoising hardware 420 is included. Although the computing device 400 in FIG. 4 includes applications 430 and hardware 420 for the patch-based method for video denoising, the patch-based method for video denoising is able to be implemented on a computing device in hardware, software or any combination thereof. For example, in some embodiments, the patch-based method for video denoising applications 430 are programmed in a memory and executed using a processor. In another example, in some embodiments, the patch-based method for video denoising hardware 420 is programmed hardware logic including gates specifically designed to implement the patch-based method for video denoising.

In some embodiments, the patch-based method for video denoising application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch) or any other suitable computing device.

To utilize the patch-based method for video denoising described herein, a video is acquired. The video is then processed using the patch-based method for video denoising to generate a denoised video. The processing is able to occur automatically without human involvement.

In operation, the patch-based method for video denoising cuts computation costs and memory usage significantly and is useful in any video application such as television, recorded video (e.g., DVD or Blu-Ray), and/or gaming.

Some Embodiments of an Efficient Path-Based Method for Video Denoising

1. A method programmed in a non-transitory memory of a device comprising:
   estimating motion to generate motion estimation information based on a current noisy frame and a previously denoised frame;
   generating a motion estimation-compensated previous patch with the motion estimation information;
   processing a current noisy patch from the current noisy frame and the motion estimation-compensated previous patch to generate a denoised patch; and
   aggregating the denoised patch and additional denoised patches to generate a denoised frame.

2. The method of clause 1 further comprising selecting the current noisy frame from a video, and selecting the current noisy patch from the current noisy frame.

3. The method of clause 2 wherein selecting the current noisy frame and selecting the current noisy patch are performed sequentially.

4. The method of clause 2 wherein selecting the current noisy frame and selecting the current noisy patch are based on comparing noise of each the current noisy frame and the current noisy patch with one or more thresholds.

5. The method of clause 1 wherein aggregating includes utilizing a rotation-buffer aggregation.

6. The method of clause 1 wherein processing the current noisy patch from the current noisy frame and the motion estimation-compensated previous patch to generate the denoised patch includes:
   generating a difference patch from the current noisy patch and a previous denoised patch;
   when a sum of absolute values of the difference patch is greater than a threshold, the current noisy patch is denoised to generate the denoised patch; and
   when the sum of absolute values of the difference patch is not greater than the threshold, the difference patch is denoised, the denoised difference patch and the previous denoised patch are used to determine a temporal denoised patch, and blending the temporal denoised patch and the current noisy patch to generate the denoised patch.

7. An apparatus comprising:
   a non-transitory memory for storing an application, the application for:
   estimating motion to generate motion estimation information based on a current noisy frame and a previously denoised frame;
   generating a motion estimation-compensated previous patch with the motion estimation information;
   processing a current noisy patch from the current noisy frame and the motion estimation-compensated previous patch to generate a denoised patch; and
   aggregating the denoised patch and additional denoised patches to generate a denoised frame; and a processing component coupled to the memory, the processing component configured for processing the application.
8. The apparatus of clause 7 further comprising selecting the current noisy frame from a video, and selecting the current noisy patch from the current noisy frame.
9. The apparatus of clause 8 wherein selecting the current noisy frame and selecting the current noisy patch are performed sequentially.
10. The apparatus of clause 8 wherein selecting the current noisy frame and selecting the current noisy patch are based on comparing noise of each the current noisy frame and the current noisy patch with one or more thresholds.
11. The apparatus of clause 7 wherein aggregating includes utilizing a rotation-buffer aggregation.
12. The apparatus of clause 7 wherein processing the current noisy patch from the current noisy frame and the motion estimation-compensated previous patch to generate the denoised patch includes:
generating a difference patch from the current noisy patch and a previous denoised patch;
when a sum of absolute values of the difference patch is greater than a threshold, the current noisy patch is denoised to generate the denoised patch; and
when the sum of absolute values of the difference patch is not greater than the threshold, the difference patch is denoised, the denoised difference patch and the previous denoised patch are used to determine a temporal denoised patch, and blending the temporal denoised patch and the current noisy patch to generate the denoised patch.
13. A system comprising:
a camera for acquiring a video; and
a computing device configured for:
estimating motion to generate motion estimation information based on a current noisy frame and a previously denoised frame of the video;
generating a motion estimation-compensated previous patch with the motion estimation information;
processing a current noisy patch from the current noisy frame and the motion estimation-compensated previous patch to generate a denoised patch; and
aggregating the denoised patch and additional denoised patches to generate a denoised frame; and
a processing component coupled to the memory, the processing component configured for processing the application.
14. The system of clause 13 further comprising selecting the current noisy frame from the video, and selecting the current noisy patch from the current noisy frame.
15. The system of clause 14 wherein selecting the current noisy frame and selecting the current noisy patch are performed sequentially.
16. The system of clause 14 wherein selecting the current noisy frame and selecting the current noisy patch are based on comparing noise of each the current noisy frame and the current noisy patch with one or more thresholds.
17. The system of clause 13 wherein aggregating includes utilizing a rotation-buffer aggregation.
18. The system of clause 13 wherein processing the current noisy patch from the current noisy frame and the motion estimation-compensated previous patch to generate the denoised patch includes:
generating a difference patch from the current noisy patch and a previous denoised patch;
when a sum of absolute values of the difference patch is greater than a threshold, the current noisy patch is denoised to generate the denoised patch; and
when the sum of absolute values of the difference patch is not greater than the threshold, the difference patch is denoised, the denoised difference patch and the previous denoised patch are used to determine a temporal denoised patch, and blending the temporal denoised patch and the current noisy patch to generate the denoised patch.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
estimating motion to generate motion estimation information based on a current noisy frame and a previously denoised frame;
generating a motion estimation-compensated previous patch with the motion estimation information;
processing a current noisy patch from the current noisy frame and the motion estimation-compensated previous patch to generate a denoised patch; and
aggregating the denoised patch and additional denoised patches to generate a denoised frame, wherein processing the current noisy patch from the current noisy frame and the motion estimation-compensated previous patch to generate the denoised patch includes:
generating a difference patch from the current noisy patch and a previous denoised patch;
when a sum of absolute differences of the difference patch is greater than a threshold, the current noisy patch is denoised to generate the denoised patch; and
when the sum of absolute differences of the difference patch is not greater than the threshold, the difference patch is denoised, the denoised difference patch and the previous denoised patch are used to determine a temporal denoised patch, and blending the temporal denoised patch and the current noisy patch to generate the denoised patch.
2. The method of claim 1 further comprising selecting the current noisy frame from a video, and selecting the current noisy patch from the current noisy frame.
3. The method of claim 2 wherein selecting the current noisy frame and selecting the current noisy patch are performed sequentially.
4. The method of claim 2 wherein selecting the current noisy frame and selecting the current noisy patch are based on comparing noise of each the current noisy frame and the current noisy patch with one or more thresholds.
5. The method of claim 1 wherein aggregating includes utilizing a rotation-buffer aggregation.
6. An apparatus comprising:
a non-transitory memory for storing an application, the application for:
estimating motion to generate motion estimation information based on a current noisy frame and a previously denoised frame;

generating a motion estimation-compensated previous patch with the motion estimation information;
processing a current noisy patch from the current noisy frame and the motion estimation-compensated previous patch to generate a denoised patch; and
aggregating the denoised patch and additional denoised patches to generate a denoised frame, processing the current noisy patch from the current noisy frame and the motion estimation-compensated previous patch to generate the denoised patch includes:
generating a difference patch from the current noisy patch and a previous denoised patch;
when a sum of absolute differences of the difference patch is greater than a threshold, the current noisy patch is denoised to generate the denoised patch; and
when the sum of absolute differences of the difference patch is not greater than the threshold, the difference patch is denoised, the denoised difference patch and the previous denoised patch are used to determine a temporal denoised patch, and blending the temporal denoised patch and the current noisy patch to generate the denoised patch; and
a processing component coupled to the memory, the processing component configured for processing the application.

7. The apparatus of claim 6 further comprising selecting the current noisy frame from a video, and selecting the current noisy patch from the current noisy frame.

8. The apparatus of claim 7 wherein selecting the current noisy frame and selecting the current noisy patch are performed sequentially.

9. The apparatus of claim 7 wherein selecting the current noisy frame and selecting the current noisy patch are based on comparing noise of each the current noisy frame and the current noisy patch with one or more thresholds.

10. The apparatus of claim 6 wherein aggregating includes utilizing a rotation-buffer aggregation.

11. A system comprising:
a camera for acquiring a video; and
a computing device configured for:
estimating motion to generate motion estimation information based on a current noisy frame and a previously denoised frame of the video;
generating a motion estimation-compensated previous patch with the motion estimation information;
processing a current noisy patch from the current noisy frame and the motion estimation-compensated previous patch to generate a denoised patch; and
aggregating the denoised patch and additional denoised patches to generate a denoised frame, processing the current noisy patch from the current noisy frame and the motion estimation-compensated previous patch to generate the denoised patch includes:
generating a difference patch from the current noisy patch and a previous denoised patch;
when a sum of absolute differences of the difference patch is greater than a threshold, the current noisy patch is denoised to generate the denoised patch; and
when the sum of absolute differences of the difference patch is not greater than the threshold, the difference patch is denoised, the denoised difference patch and the previous denoised patch are used to determine a temporal denoised patch, and blending the temporal denoised patch and the current noisy patch to generate the denoised patch; and
a processing component coupled to the memory, the processing component configured for processing the application.

12. The system of claim 11 further comprising selecting the current noisy frame from the video, and selecting the current noisy patch from the current noisy frame.

13. The system of claim 12 wherein selecting the current noisy frame and selecting the current noisy patch are performed sequentially.

14. The system of claim 12 wherein selecting the current noisy frame and selecting the current noisy patch are based on comparing noise of each the current noisy frame and the current noisy patch with one or more thresholds.

15. The system of claim 11 wherein aggregating includes utilizing a rotation-buffer aggregation.

* * * * *